US012723161B2

(12) United States Patent
Datt et al.

(10) Patent No.: US 12,723,161 B2
(45) Date of Patent: Sep. 1, 2026

(54) SOLVENT-BASED OXYGEN BARRIER COATING COMPOSITION

(71) Applicant: Siegwerk Druckfarben AG & Co. KGaA, Siegburg (DE)

(72) Inventors: Ashish Datt, West Des Moines, IA (US); Ayuna Tsyrenova, Urbandale, IA (US); Hannah Rothfuss, Siegburg (DE)

(73) Assignee: Siegwerk Druckfarben AG & Co. KGaA, Siegburg (DE)

(*) Notice: Subject to any disclaimer, the term of this patent is extended or adjusted under 35 U.S.C. 154(b) by 287 days.

(21) Appl. No.: 18/488,230

(22) Filed: Oct. 17, 2023

(65) Prior Publication Data

US 2025/0122385 A1 Apr. 17, 2025

(51) Int. Cl.

| | |
|---|---|
| ***C09D 5/08*** | (2006.01) |
| ***B32B 27/08*** | (2006.01) |
| ***B32B 27/32*** | (2006.01) |
| ***B65D 65/42*** | (2006.01) |
| ***C08J 7/04*** | (2020.01) |
| ***C08J 7/048*** | (2020.01) |
| ***C09D 7/20*** | (2018.01) |
| ***C09D 7/63*** | (2018.01) |
| ***C09D 101/16*** | (2006.01) |
| ***C09D 139/06*** | (2006.01) |
| ***D21H 19/34*** | (2006.01) |
| ***D21H 21/38*** | (2006.01) |

(52) U.S. Cl.

CPC ................ *C09D 5/08* (2013.01); *B32B 27/08* (2013.01); *B32B 27/32* (2013.01); *B65D 65/42* (2013.01); *C08J 7/0427* (2020.01); *C08J 7/048* (2020.01); *C09D 7/20* (2018.01); *C09D 7/63* (2018.01); *C09D 101/16* (2013.01); *C09D 139/06* (2013.01); *D21H 19/34* (2013.01); *D21H 21/38* (2013.01); *B32B 2250/02* (2013.01); *B32B 2250/242* (2013.01); *B32B 2255/10* (2013.01); *B32B 2255/26* (2013.01); *B32B 2255/28* (2013.01); *B32B 2307/31* (2013.01); *B32B 2307/4023* (2013.01); *B32B 2307/412* (2013.01); *B32B 2307/516* (2013.01); *B32B 2307/7244* (2013.01); *B32B 2439/46* (2013.01); *B32B 2439/70* (2013.01); *B65D 2565/387* (2013.01); *C08J 2323/06* (2013.01); *C08J 2323/12* (2013.01); *C08J 2401/16* (2013.01); *C08J 2439/06* (2013.01)

(58) Field of Classification Search

USPC .................................................. 528/271, 272

See application file for complete search history.

(56) References Cited

U.S. PATENT DOCUMENTS

| | | | | |
|---|---|---|---|---|
| 5,508,113 | A | 4/1996 | Knoerzer | |
| 10,059,087 | B2 * | 8/2018 | Kaneiwa | B32B 27/40 |

FOREIGN PATENT DOCUMENTS

| | | | | |
|---|---|---|---|---|
| EP | 1 769 042 | B1 | 3/2011 | |
| EP | 2 426 176 | A1 | 3/2012 | |
| EP | 2 534 213 | B1 | 10/2013 | |
| EP | 3 168 271 | A1 | 5/2017 | |
| EP | 3459990 | A1 * | 3/2019 | B32B 27/08 |
| EP | 3 932 642 | A1 | 1/2022 | |
| JP | 2017-110142 | A | 6/2017 | |
| WO | 2023/285183 | A1 | 1/2023 | |

OTHER PUBLICATIONS

Leach/Pierce (Eds.), The Printing Ink Manual, Blueprint, London, 5th ed. 1993, p. 33-53, 473-598, See Spc., pp. 18-19.

V. Thuy et al., “Sustainable, self-cleaning, transparent, and moisture/oxygen-barrier coating films for food packaging”, Green Chemistry, Royal Society of Chemistry, 23, pp. 2658-2667, Jan. 1, 2021, See Spc., p. 1.

* cited by examiner

*Primary Examiner* — Terressa Boykin

(74) *Attorney, Agent, or Firm* — Secant IP, P.L.L.C.

(57) ABSTRACT

The present invention is related to a solvent-based composition for preparing an oxygen barrier coating, comprising a binder polymer containing polar functional groups that are capable of interacting with an acidic group; an acid containing at least two reactive acidic groups; and an organic solvent. The present invention is furthermore related to a coated product comprising said oxygen-barrier coating layer, and to a method for making a coated product.

17 Claims, No Drawings

SOLVENT-BASED OXYGEN BARRIER COATING COMPOSITION

The present invention is related to a solvent-based (SB) composition for making an oxygen barrier coating and a product comprising said oxygen barrier coating.

Articles made of plastic (i.e. synthetic polymers such as polyethylene (PE), polypropylene (PP) or polyethylene terephthalate (PET)) are extremely efficient for the purposes of flexible packaging. However, the packed goods (food, pharmaceutics etc) often need to be protected from influences of the environment. If the required protection/barrier is not provided by the (plastic) packaging material itself, additional (polymer) layers have to be attached to fulfil the necessary protection of the goods. Of specific interest is the protection of the packed goods from a permeation of oxygen and moisture. If not protected sufficiently, food provided within said flexible packaging may suffer from detrimental effects such as oxidation or hydration/dehydration. To address this problem, oxygen barrier coating layers have been provided in flexible packaging materials. Conventionally, coatings consisting of metal oxides and chlorinated polymers, such as poly(vinyl chloride) (PVC) and poly (vinylidene chloride) (PVDC), have been used for this purpose. Aluminum oxide with an oxygen transmission rate (OTR) of approximately 1 mL/$m^2$ day has been most commonly used these days (Thuy et al., Green Chem., 2021, 23, 2658).

However, flexible packaging materials comprising such an oxygen barrier coating layer often give rise to health and environmental issues or prohibit the recyclability of the packaging material, due to the characteristics of the used materials (presence of metals, chlorinated polymers).

In order to address the problems that are associated with oxygen barrier coating layers consisting of metals and chlorinated polymers, oxygen barrier coating layers have been suggested that are made from polyvinyl alcohol (PVOH) (e.g. U.S. Pat. No. 5,508,113 A).

While such layers address the environmental and health problems mentioned above, their chemical composition allows only for water-based (WB) solutions. Being printed on olefinic films and/or in combination with further SB inks/coatings, the water-based OBC reduces the printing speed significantly, as water is more difficult to dry than organic solvents.

In WO 2023/285183 A1, a kit is described comprising a composition for preparing an oxygen barrier coating comprising a polymer having reactive hydroxyl groups, and a composition for preparing a layer selected from the group consisting of an ink layer and an overprint varnish layer, wherein in said latter composition there is a component that is capable of crosslinking with the polymer of the first composition when the compositions are applied one after another. Therewith, a sequence of layers is obtained wherein the reactive hydroxyl groups of said polymer in said oxygen barrier coating layer are reacted with said component in said other adjacent layer, resulting in a crosslinking reaction between these adjacent layers. In consequence, the manufacturing process of the present invention can be carried out with a printing speed similar to commercial printing processes.

However, the composition for preparing an oxygen barrier coating of WO 2023/285183 A1 is water-based. This is because the polymer in said oxygen barrier coating composition is polyvinyl alcohol (PVOH), or a copolymer or derivative thereof. In order to dissolve such polymers, a high amount of water is necessary. When applying such a composition onto a polymeric substrate or film, the water has to be exhaustively removed by drying, for example because residual, small amounts of water remaining in the oxygen barrier coating decrease its barrier function.

However, this limits the amount of applicable coating weight, as high coating weights are difficult to dry. Also, the printing speed is reduced, because existing drying systems do not have the required drying capacity for sufficiently fast drying. In case there are further inks or coatings to be applied in flexo printing, the water-based oxygen barrier coating composition should be printed as the last layer to allow for the water to be sufficiently evaporated. This limitation in the printed structures reduces its flexibility.

Furthermore, some printing machines do not allow the use of water-based inks or coatings because of the risk of rusting. The combination of water-based inks/coatings with solvent-based inks/coatings is also often not processable by SB-printers because the installed solvent-recovery or -incineration system cannot afford water vapor passing through.

In JP-2017/110142 A1, a solvent-based composition is described that is stated to be suitable for making an oxygen barrier layer. Said composition comprises a polyester polyol that is based on an ortho-oriented aromatic dicarboxylic acid, such as phthalic acid or its acid anhydride and a polyhydric alcohol, such as ethylene glycol. Said polyester polyol is cured by reaction with a polyisocyanate.

While said composition is solvent-based, it has certain use limitations due to the need for the specific chemical compounds involved.

It was therefore the problem of the present invention to provide a product such as a flexible packaging for food applications that overcomes the above drawbacks of the prior art. In particular, it was the problem to provide a solvent-based oxygen barrier coating composition that allows for the manufacture of a wide range of such flexible packaging in a fast and efficient process.

According to the present invention, the above problem has been solved by the subject-matter defined in the claims.

In particular, the present invention is related to a solvent-based composition for preparing an oxygen barrier coating, comprising a) a binder polymer containing polar functional groups that are capable of interacting with an acidic group;

b) an acid containing at least two reactive acidic groups; and c) an organic solvent.

The present invention provides for a composition that due to the employed chemistry can be readily formulated in a conventional organic solvent while providing some flexibility for modifications.

Since the organic solvent used in the composition of the present invention can be evaporated more easily than water, the composition of the present invention can be used in conventional printing processes without any adverse effect on printing speed. The composition of the present invention can also be printed as the first layer of a multi-layer structure (such as a laminate) directly on a substrate, since it can be readily dried. In addition, the composition of the present invention also can be used as a deinking/delamination coating, and provides excellent grease barrier properties.

According to the present invention, the term “laminate” refers to a product that consists of a stack of layers, wherein one layer (an outermost layer or a core layer) is defined as substrate or substrate layer. For example, the substrate layer may be a plastic layer, preferably a transparent plastic layer. A laminate may also preferably comprise more than one of those substrate layers, most preferably as outermost layers, and in between these substrate layers there may be provided a printed layer or several printed layers, as well as other functional layers. These intermediate layers are protected by the substrates from environmental influences. In such a laminate, the one or more printed layers can be connected to a substrate layer via a primer layer and/or an adhesive layer.

The solvent-based composition for preparing an oxygen barrier coating comprises a binder as one main component. Said binder has to be soluble in an organic solvent. On the other hand, said binder contains polar functional groups that are capable of interacting with an acidic group. By "interacting" it is meant that said polar functional groups can enter into some sort of interaction with the acidic groups. For example, the formation of a covalent bond, of an ionic bond, or a hydrogen bond bridging the groups, may be mentioned.

According to the present invention, said binder is a polymer. According to common understanding, a polymer is a macromolecule that is composed of a plurality of monomers. A polymer that is composed of one type of monomer is a homopolymer. A polymer that is composed of at least two different types of monomers is a copolymer. However, typically polymers that are composed of one single repeating unit that consists of two specific monomers (such as PET) are also designated as homopolymers. Polymers differ from oligomers in the number of repeating units that are present in the macromolecule, said number being smaller in oligomers. There is no sharp distinction between oligomers and polymers. Typically, a molecule comprising 5-100 repeating units is referred to an oligomer, whereas a molecule having more than 100 repeating units is referred to as "polymer". According to a preferred embodiment of the present invention, the binder has a weight average molecular weight in the range from 2000-300000 Da, preferably 5000-100000 Da.

According to the present invention, said binder polymer may be a linear or branched polymer.

According to the present invention, said binder polymer comprises polar functional groups. A polar functional group is a chemical group that comprises a permanent electric dipole moment, due to the presence of atoms in the group that have different electronegativity.

According to a preferred embodiment, said polar functional groups are selected from the group consisting of hydroxy, amino, thiol, amide, carbonyl, ester, and acetal groups.

According to another preferred embodiment of the present invention, each monomer unit of the binder polymer comprises at least one of said polar functional groups. This ensures the necessary reactivity of the binder polymer with the acid component discussed below.

According to a particularly preferred embodiment of the present invention, said binder polymer has a plurality of polar functional groups and is selected from the group consisting of polyvinyl pyrrolidone (PVP), nitrocellulose (NC) and polyvinyl butyral (PVB). These polymers are well-known and commercially available.

According to a preferred embodiment, said binder polymer is present in the solvent-based composition of the present invention for preparing an oxygen barrier coating in an amount from 10 to 30 wt.-%, preferably 10 to 25 wt.-%, and especially preferred 15 to 20 wt.-%, based on the entire amount of the solvent-based composition of the present invention.

The solvent-based composition for preparing an oxygen barrier coating comprises an acid as another main component.

According to the present invention, the term "acid" designates proton-donating compounds, i.e. Bronsted acids.

The acid can be an inorganic acid, such as HCl, $H_2SO_4$ or $H_3PO_4$. Preferably, however, said acid is an organic acid.

According to a further preferred embodiment, said organic acid is an acid containing at least two reactive carboxyl groups. Especially preferred, said organic acid is selected from the group consisting of oxalic acid, malonic acid, succinic acid, glutaric acid, adipic acid, tartaric acid, boric acid, malic acid, polyacrylic acid, citric acid, and isocitric acid.

According to a preferred embodiment, said acid is present in the solvent-based composition of the present invention for preparing an oxygen barrier coating in an amount from 10 to 30 wt.-%, preferably 10 to 25 wt.-%, and especially preferred 10 to 20 wt.-%, based on the entire amount of the solvent-based composition of the present invention.

The solvent-based composition for preparing an oxygen barrier coating comprises an organic solvent. Said organic solvent has to be capable of dissolving the binder polymer present in said composition.

According to a preferred embodiment, said organic solvent is a polar organic solvent. A polar organic solvent is a solvent that comprises a permanent electric dipole moment, due to the presence of atoms in the solvent that have different electronegativity.

According to a very preferred embodiment, said polar organic solvent is an alcohol or an ester, or a combination of alcohol and ester. Especially preferred are mono alcohols, such methanol, ethanol, n-propanol or iso-propanol, or mono carboxylic esters, such as ethyl acetate, n-propyl acetate, isopropyl acetate, or neopentyl acetate. Those organic solvents have a low boiling point and can thus be evaporated efficiently and quickly.

According to a preferred embodiment, said organic solvent is present in the solvent-based composition of the present invention for preparing an oxygen barrier coating in an amount from 40 to 80 wt.-%, preferably 45 to 75 wt.-%, and especially preferred 50 to 70 wt.-%, based on the entire amount of the solvent-based composition of the present invention.

According to the present invention, the wt.-% of all the components in the solvent-based composition of the present invention for preparing an oxygen barrier coating sum up to 100 wt.-%.

The solvent-based composition of the present invention may optionally comprise at least one additive that is conventionally used in oxygen barrier coating compositions. Examples are biocides such as lactic acid, fungicides, adhesion promoters, antioxidants such as BHT (butylated hydroxytoluene), crosslinkers such as polyethyleneimine, surfactants, antiblocking additives, wax, and wetting aids, that do not adversely affect the oxygen barrier properties of the oxygen barrier coating layer manufactured from said composition. The solvent-based composition of the present invention comprises at least one additive described above, if present at all, in an amount of preferably 0.01 to 6 wt.-%, more preferably 0.2 to 5 wt.-%, and even more preferably 0.5 to 4 wt.-%, based on the weight of the entire solvent-based composition of the present invention.

The solvent-based composition of the present invention can be manufactured in a conventional manner by adding all components together in a suitable vessel, and stirring the mixture to obtain a homogeneous solution. Optionally, the mixture can be heated to 30-60° C. to assist the formation of a homogeneous solution.

The solvent-based composition of the present invention is suitable for the formation of an oxygen-barrier coating layer. Such an oxygen-barrier coating layer is useful in coated products such as flexible packagings, as discussed earlier. Accordingly, the present invention is also related to a coated product, comprising a substrate and an oxygen-barrier coating layer, wherein said oxygen-barrier coating layer is made from the solvent-based composition according to the present invention.

The coated product of the present invention comprises a substrate.

According to the present invention, the substrate may be any material suitable for use in a flexible packaging material. Preferably, said substrate is selected from the group consisting of paper and a plastic substrate.

Examples of plastic substrates suitable according to the present invention are a film of polyethylene, such as MDO-PE (machine direction-oriented PE), biaxially oriented polyethylene (BOPE), polypropylene, such as biaxially oriented polypropylene (BOPP), polyethylene terephthalate (PET), oriented polyamide (OPA) or polylactic acid (PLA). It is also possible to use paper, metallized paper or cardboard as a substrate.

According to the present invention, the dimensions of the substrate are not particularly limited. Preferably, said substrate has a thickness of more than 10 μm, preferably 10-150 μm.

According to a preferred embodiment of the present invention, onto at least one surface of said substrate, there may be applied directly said oxygen barrier coating layer. As mentioned earlier, the composition of the present invention can also be printed as the first layer of a multi-layer structure (such as a laminate) directly on a substrate, since it can be readily dried.

While the solvent-based composition according to the present invention can be applied on a substrate by any standard technique, according to the present invention it is preferred to use flexographic or gravure printing for said application.

If desired, one or more other layers may be applied onto said oxygen barrier coating layer, for example one or more ink layers.

Alternatively, first a layer can be applied onto said at least one surface of said substrate, followed by applying said oxygen barrier coating layer onto said layer.

Said layer may be a primer layer as known in the art. A number of coatings or primers have been developed for use on substrates such as polymeric films which render the surface of the films more receptive to subsequently applied layers.

For example, in EP-1 769 042 B1 a primer coating is disclosed which comprises a combination of a copolymer of ethylene and acrylic or methacrylic acid and an aliphatic polyurethane dispersion together with a metal hydroxide antiblocking agent. In EP-2 534 213 A1, a primer coating is disclosed which includes a natural rosin dispersion comprising a hydrogenated hydrocarbon rosin or rosin ester and a protective colloid forming material, and a dispersion of a copolymer of ethylene and acrylic or methacrylic acid. In EP-2 426 176 A1, a solvent-free energy curable liquid primer coating for enhancing ink adhesion to a substrate comprising a polyester acrylate, at least one acrylated amine, and optionally, a photoinitiator is disclosed.

In EP-3 168 271 A1, a water-based primer composition is disclosed comprising porous submicron silica, starch, and at least one component selected from the group consisting of a further polysaccharide, a hemicellulose, lignin, styrene-acrylic emulsion, a polyvinylacetate and a sulfopolyester.

In EP-3 932 642 A1, primer composition for delaminating and optionally deinking of a substrate is described, wherein said primer composition comprises as a first binder component a component that has a polymeric backbone with pendent hydroxy and/or carboxy groups that have been esterified or acetalized or ketalized to such an extent that the first binder component has an acid value of 0-50 mg KOH/g or a hydroxyl value of 0-600 mg KOH/g, and as a modifying component a compound selected from the group consisting of a soft resin, a plasticizer, or combinations thereof, so that a primer layer prepared from said primer composition is dissolvable in an alkaline aqueous medium.

Such primer layers may be use din accordance with the present invention.

In another embodiment, said layer applied onto a surface of said substrate may be an ink layer. Compositions for making ink layers are generally known. While the composition can be applied on a substrate by any standard technique, according to the present invention it is preferred to use ink compositions that are adapted for application by flexographic or gravure printing.

Compositions for making ink layers for flexible packaging materials comprise a binder component. According to the present invention, any binder conventionally used for making ink layers for flexible packaging materials is suitable. Suitable examples are acrylic or methacrylic acid resins, polyurethane resins, rosin-based resins, polyamide resins, polyvinylchloride, polyesters such as polyester polyols, cellulose and derivatives such as nitrocellulose or cellulose acetate butyrate, lignin and derivatives such as nitro lignin, and combinations thereof. Preferably, the composition for making ink layers comprises 10 to 60 wt.-%, more preferably 20 to 40 wt.-%, based on the weight of the entire composition, of said binder component.

Compositions for making ink layers for flexible packaging materials furthermore comprise at least one solvent. According to the present invention, any solvent conventionally used for making ink layers for flexible packaging materials is suitable. Suitable examples are water or preferably an organic solvent such as methyl ethyl ketone, an alcohol such as ethanol or isopropanol, ethyl acetate, isopropyl acetate, tetrahydrofuran, dichloromethane, acetone, dimethyl formamide, acetonitrile, dimethyl sulfoxide, and combinations thereof. Preferably, the composition for making ink layers comprises 10 to 30 wt.-%, more preferably 15 to 25 wt.-%, based on the weight of the entire composition, of said at least one solvent.

Compositions for making ink layers for flexible packaging materials preferably comprise at least one colorant, preferably a dye or a pigment, especially preferred a pigment. According to the present invention, any colorant conventionally used for making ink layers for flexible packaging materials is suitable. Depending on the kind of colorant used, the composition may provide a colored layer or a white layer.

If a colored layer is to be provided, the colorant may be selected from the group consisting of a cyan pigment, a magenta pigment, a yellow pigment, and a black pigment. Such pigments are generally known in the art. Examples of suitable commercially available pigments are Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM YELLOW HR, NOVAPERM YELLOW FGL, Hansa Brilliant Yellow 10GX, Permanent Yellow G3R-01, HOSTAPERM YELLOW H4G, HOSTAPERM YELLOW H3G, HOSTAPERM ORANGE GR, HOSTAPERM SCARLET GO, Permanent Rubine F6B, L74-1357 Yellow, L75-1331 Yellow, L75-2337 Yellow, DALAMAR YELLOW YT-858-D, CROMOPHTHAL YELLOW 3 G, CROMOPHTHAL YELLOW GR, CROMOPHTHAL YELLOW 8 G, IRGAZINE YELLOW 5GT, IRGALITE RUBINE 4BL, MONASTRAL MAGENTA, MONASTRAL SCARLET, MONASTRAL VIOLET, MONASTRAL RED, MONASTRAL VIOLET, LUMOGEN LIGHT YELLOW, PALIOGEN ORANGE, HELIOGEN BLUE L 690 IF, HELIOGEN BLUE TBD 7010, HELIOGEN BLUE K 7090, HELIOGEN BLUE L 710 IF, HELIOGEN BLUE L 6470, HELIOGEN GREEN K 8683, HELIOGEN GREEN L 9140, QUINDO MAGENTA, INDOFAST BRILLIANT SCARLET, QUINDO RED 6700, QUINDO RED 6713, INDOFAST VIOLET, Maroon B STERLING NS BLACK, STERLING NSX 76, and MOGUL L.

If the ink layer is a white ink layer, it comprises as a colorant a white pigment. Suitable white pigments are generally known in the art. Examples are $TiO_2$, calcium carbonate, zinc oxide, alumina-$TiO_2$, barium sulphate and mixtures thereof.

Preferably, the composition for making ink layers comprises 0 to 70 wt.-%, more preferably 20 to 60 wt.-%, based on the weight of the entire composition, of said colorant, preferably pigment.

Compositions for making ink layers for flexible packaging materials may optionally comprise at least one additive. According to the present invention, any additive conventionally used for making ink layers for flexible packaging materials is suitable. Typically used additives may be selected from the group consisting of a wax, surfactants, biocides, adhesion promoters and crosslinkers such as polyethyleneimine, fillers, matting agents, materials for pH adjustment, sequestering agents, preservatives, antioxidants (e.g. Irganox 1010), plasticizers, compatibility additives, emulsifiers, and adhesion promoters (such as Vertec PI-2 from Johnson Mathey; this is a titanate coupling agent (Ethoxy isopropoxy titanium bis(2, 4-pentanedionate)). Such additives are known. Typical fillers are calcium carbonate, magnesium carbonate, china clay, or mixtures thereof. Typical waxes are polyethylene or paraffin waxes. Preferably, the composition for making ink layers comprises 0 to 20 wt.-%, more preferably 0.1 to 10 wt.-%, based on the weight of the entire composition, of at least one additive.

In one embodiment of the present invention, the coated product may have the following sequence of layers: substrate-oxygen barrier coating layer-optionally one or more ink layer-optionally an overprint varnish layer.

Compositions for making overprint varnish (OVP) layers are also generally known. While the composition can be applied on a substrate by any standard technique, according to the present invention it is preferred to use overprint varnish (OVP) compositions that are adapted for application by flexographic or gravure printing.

Overprint varnish (OVP) compositions generally differ from ink compositions by the absence of a colorant such as a pigment. Thus, the above description for compositions for making ink layers also applies with respect to the binder component, at least one solvent, and the optional additives. However, the composition for making overprint varnish (OVP) layers preferably comprises 20 to 80 wt.-%, more preferably 30 to 75 wt.-%, based on the weight of the entire composition, of said binder component.

According to another preferred embodiment of the present invention, the coated product is a laminate, wherein said laminate contains two substrates between which said oxygen-barrier coating layer, at least one ink layer and optionally an adhesive layer are provided.

Adhesive layers are known in the art. For the purposes of the present invention, any adhesive layer conventionally used to bond films in flexible laminates may be employed. One adhesive type used to bond separate films into flexible composite laminates is polyurethane, which may be solvent-based, solvent-free or water-based. Solvent based and solvent free polyurethane adhesives are preferred. Polyurethane adhesives are based on reaction of an isocyanate moiety containing component with an isocyanate reactive component. In one component (1K) variations the isocyanate moiety containing component is reacted with the isocyanate reactive component to form an isocyanate moiety containing, moisture reactive, oligomer or prepolymer. The prepolymer is disposed between substrates to be bonded and exposed to moisture from the atmosphere and substrate surfaces to initiate crosslinking and bonding of the substrates. The prepolymer must be prepared and stored under moisture free conditions until use. In two component (2K) variations the isocyanate moiety containing component and the isocyanate reactive component are stored separately and only mixed shortly before use. Mixing the two components initiates a crosslinking reaction with the reaction products typically being an insoluble, thermoset solid. The mixed adhesive is disposed between substrates to be bonded wherein the crosslinked adhesive bonds the substrates. The isocyanate moiety containing component can be a polyisocyanate, an isocyanate containing oligomer or prepolymer or a combination thereof. Polyisocyanates useful by themselves or as a reactant with a polyol for preparing an isocyanate functional oligomer or prepolymer are described herein. MDI and/or its isomers is one useful polyisocyanate. The isocyanate reactive component typically comprises one or more polyols. Polyols that can be used include those polyols typically used for the production of polyurethanes, including, without limitation, polyether polyols, polyester polyols, polybutadiene polyols, polycarbonate polyols, polyacetal polyols, polyamide polyols, polyesteramide polyols, polyalkylene polyether polyols, polythioether polyols and mixtures thereof; preferably polyether polyols, polyester polyols, polycarbonate polyols and mixtures thereof; and more preferably polyester polyols, polyether polyols and combinations thereof.

Examples of a solvent free and water free 2K polyurethane adhesive include LOCTITE LIOFOL LA7732/LA6159, LA7780/LA6159 and LA1139-04/LA6029 (all commercially available from Henkel).

According to a preferred embodiment of the present invention, the solvent-based composition for preparing an oxygen barrier coating of the invention is applied in a dry solids coating weight in the range from 0.2 $g/m^2$ to 2 $g/m^2$, preferably 0.5 $g/m^2$ to 1.5 $g/m^2$, more preferably 0.6 $g/m^2$ to 1.2 $g/m^2$. An oxygen barrier coating layer obtained therefrom exhibits a desired OTR value as measured at 0% and 50% relative humidity of less than 50 $cm^3/m^2/24$ h, preferably less than 30 $cm^3/m^2/24$ h, more preferably less than 20 $cm^3/m^2/24$ h, even more preferably less than 5 $cm^3/m^2/24$ h, and especially preferred less than 1 $cm^3/m^2/24$ h. OTR values can be measured by any method known in the art, preferably with the method described in the examples.

In accordance with the above description, the sequence of layers in the laminate may preferably be either a) substrate-oxygen barrier coating layer-ink layer(s)-adhesive layer-substrate, or
b) substrate-ink layer(s)-oxygen barrier coating layer-adhesive layer-substrate, or
c) substrate-ink layer(s)-oxygen barrier coating layer-ink layer(s)-adhesive layer-substrate.

At least one of said ink layers may be a white layer.

According to a preferred embodiment of the present invention, 1 to 10, preferably 2-7, especially preferred 3-6 ink layers are provided in said laminate.

Ink compositions that are suitable for the laminate of the present invention have already been described above.

In said preferred embodiment, the second substrate provided on top of said adhesive layer may be a substrate as described above, or preferably it may be a heat weldable or sealable film, more preferably a heat weldable or sealable film made from a polyolefin such as polyethylene.

The layers described above can be applied onto the substrate by any conventional coating technique, preferably by flexographic or gravure printing.

Gravure and flexography are the major printing processes for printing packing materials. These processes can be used for printing a large variety of substrates, such as paper, cardboard, or plastic substrates. The gravure and flexographic printing processes are well-known. Reference may be made, for example, to Leach/Pierce (Eds.), The printing ink manual, Blueprint, London, $5^{th}$ ed. 1993, p, 33-53. Also the characteristics of gravure and flexographic inks are known to the skilled man. Reference may be made, for example, to Leach/Pierce (Eds.), The printing ink manual, Blueprint, London, $5^{th}$ ed. 1993, p, 473-598. The respective content of those chapters is incorporated herein by reference.

The layers described above are applied, according to a preferred embodiment of the present invention, in such an amount that a coating weight of 0.2-1.5 g/m$^2$, preferably 0.4-1.3 g/m$^2$, and especially preferred 0.6-1.0 g/m$^2$ is obtained for each layer. With respect to the oxygen barrier coating layer, reference is made to the description above.

The present invention is thus also related to a method for making a coated product as described above, comprising the steps:

a) providing a substrate having a surface;
b) providing a solvent-based composition for preparing an oxygen barrier coating according to the invention;
c) optionally providing at least one ink composition;
d) optionally applying the at least one ink composition onto the surface of the substrate;
e) and applying the solvent-based composition onto the surface of the substrate or onto the surface of a layer applied onto said substrate.

According to a preferred embodiment of said method, additionally at least one ink composition is applied onto said oxygen barrier coating and formed into an ink layer.

Optionally, in a further step an additional substrate such as a heat weldable or sealable film may be applied onto the above obtained coated product via an adhesive layer.

As described above, the layers described above can be applied onto the substrate by any conventional coating technique, preferably by flexographic or gravure printing.

According to a preferred embodiment of the present invention, the method is conducted as an in-line printing process. An in-line printing process is a process where a layer is applied directly onto a previously applied layer in a single process and while the substrate is in continuous motion. In an in-line process, a layer is applied onto a previously applied layer which is still wet (wet-on-wet process). Alternatively, a drying step may be performed before application of the layer onto a previously applied layer, wherein said drying step is performed inline and does not interrupt the process. In-line printing processes are generally known.

The method of the present invention may be performed in-line, using conventional equipment and conventional equipment line speeds in contrast to previous methods for providing an oxygen barrier coating.

According to the present invention, said coated product is preferably a composite laminated structure useful to form flexible packaging.

Many articles such as food articles are stored in flexible packaging, i.e. packagings which are made of a material which shows some flexibility and can thus undergo certain modifications of its shape.

Flexible packagings are widely used in areas like food packaging (e.g., retortable bags, frozen food packaging, refrigerated food packaging, shelf stable food packaging, dry goods packaging, liquid food packaging, fast food wrappers and bags), pharmaceutical packaging (e.g., primary packaging, secondary packaging, booklets and instructions), personal hygiene packaging (e.g. soap packaging, hair care packaging, baby care packaging, feminine care packaging, male care packaging), home care packaging (e.g. detergent packaging, cleaner packaging), agricultural packaging (e.g., herbicide packaging, pest control packaging, fertilizer bags), industrial packaging (e.g. shopping bags, construction wrappers and bags), and pet care packaging (e.g., pet food bags, pet medical packaging, pet hygiene packaging).

The present invention will be described hereafter with respect to non-limiting examples.

EXAMPLE 1

A solvent-based composition according to the present invention was prepared by mixing the components of table 1 with each other in the amounts indicated in table 1.

TABLE 1

| Component | Wt.-% |
|---|---|
| Binder (nitrocellulose) | 18 |
| Acid (citric acid) | 16 |
| Organic solvent (ethanol/ethyl acetate 15:1) | 65.5 |
| Antioxidant | 0.5 |

At first, the nitrocellulose was diluted in the solvent and the antioxidant was added. Afterwards, the other components were added together in a flask and stirred at room temperature with a conventional stirrer until a homogeneous solution was formed.

Onto a corona-treated OPP film, an oxygen barrier coating layer was printed using the above obtained composition. The composition was adjusted (with ethanol/ethoxypropanol 1:1) to result in a coating weight of 1.5 (g/m$^2$) using a K-proofer.

The obtained coated product was subjected to oxygen transmission rate (OTR) measurements using a Labthink C230 OTR Analyzer. Print samples were mounted to the sample cells such that the BOPP film was oriented toward the test gas (100% Oxygen, 50% RH, sample cell area 50 cm$^2$). The full test parameters are specified below:

| Ox-Tran 2/22 Experimental Parameters | |
|---|---|
| Sample Cell Area | 5.62 cm$^2$ |
| Carrier Gas | 2% Hydrogen in Nitrogen |
| Carrier Gas Relative Humidity | 0% |
| Test Gas | 100% Oxygen |
| Test Gas Relative Humidity | 0% |
| Cell Temperature | 23° C. |

-continued

| Ox-Tran 2/22 Experimental Parameters | |
|---|---|
| Test Mode | Convergence by cycle, 3 cycles, 1% convergence |
| Cycle Time | 30 minutes |

The resulting oxygen barrier coating layer had an OTR value of 10 $cm^3/m^2/24$ h.

EXAMPLE 2

A solvent-based composition according to the present invention was prepared by mixing the components of table 2 with each other in the amounts indicated in table 2.

TABLE 2

| Component | Wt.-% |
|---|---|
| Binder (polyvinyl pyrrolidone) | 15 |
| Acid (citric acid) | 14 |
| Organic solvent (ethanol) | 67 |
| Anti-block additive | 2 |
| Wax | 2 |

All components were added together in a flask and stirred at room temperature with a conventional stirrer until a homogeneous solution was formed.

Onto a MDOPE film, an oxygen barrier coating layer was printed using the above obtained composition. The composition was gravure printed using a K-proofer at a coating weight of 1.5 ($g/m^2$).

Onto said oxygen barrier coating layer, a cyan ink composition (based on nitrocellulose as binder) and a white ink composition (based on polyurethane as binder) were subsequently applied by the same gravure printing method as used for the oxygen barrier coating layer.

The obtained sample was hand laminated following typical laboratory methods. An adhesive layer (adhesive composition from Henkel) was applied to the barrier coating on the print samples, using a K-Coater and RDS coating rod. The coating weight of adhesive applied was about 1.2 $g/m^2$. A clear polyethylene heat weldable or sealable film was then placed onto the adhesive, and the laminated constructs cured at 25° C. for seven days prior to OTR measurements.

OTR measurement was carried out as described in example 1. The resulting oxygen barrier coating layer had an OTR value of 6 $cm^3/m^2/24$ h.

EXAMPLE 3

A solvent-based composition according to the present invention was prepared by mixing the components of table 3 with each other in the amounts indicated in table 3.

TABLE 3

| Component | Wt.-% |
|---|---|
| Binder (nitrocellulose) | 18 |
| Acid (citric acid) | 16 |
| Organic solvent (ethanol/ethyl acetate 14:1) | 61.5 |
| Antioxidant | 0.5 |
| Lactic acid | 4 |

At first, the nitrocellulose was diluted in the solvent and the antioxidant was added. Afterwards, the other components were added together in a flask and stirred at room temperature with a conventional stirrer until a homogeneous solution was formed.

Onto a coated paper substrate, (UPM Solide™ Lucent 62 gsm) an oxygen barrier coating layer was printed using the above obtained composition. The composition was gravure printed using a K-proofer at a coating weight of 2.3 ($g/m^2$).

OTR measurement was carried out as described in example 1. The resulting oxygen barrier coating layer had an OTR value of less than 4 $cm^3/m^2/24$ h.

EXAMPLE 4a

The solvent-based composition according to example 2 was applied to a substrate consisting of corona-treated MDOPE film with conventional coloured and white inks already printed on it. A hand proofer with a specific anilox volume was used to achieve a dry coating weight (~1.6 $g/m^2$) of the solvent-based composition. The coated film was then dried using a stream of hot air. Next, the resulting print was laminated to a sealant web polyethylene (PE) using a solventless adhesive (Henkel 6248/1139-04). The laminate structure was MDOPE/color/white/SB OBC/PE and was cured for 5 days at room temperature. This structure exhibited a lamination bond strength of greater than 300 gf/inch (115.8 N/m).

Deinking and delamination performance was tested according to the Standard Laboratory Processing Practices recommended by Association of Plastics Recyclers (APR), USA. The prepared laminate structure was hand-cut into pieces of approximately 15×15 mm in size. Cut pieces (1.5 g) and PET flakes (55 g) were then added to 350 ml of a deinking solution (1% caustic, e.g. NaOH and 0.3% Triton X-100), which was heated up to 80° C. Washing process was conducted at 80° C. and with agitation with a magnetic stir bar at about 400 rpm for 20 mins. After that, flakes were recovered using a de-watering screen and rinsed with warm water. Washed flakes were allowed to dry at the room temperature and further evaluated.

It was found that the laminate structure was substantially delaminated. With one wash/rinse cycle, most of the ink was washed off with only slight stains remaining on film pieces.

It follows that the solvent-based composition according to the present invention can be used as a deinking/delamination coating in mono-PE laminated structure.

EXAMPLE 4B

The solvent based composition of example 1 was applied to MDOPE and laminated against PE using the adhesive from Henkel (LA7732/LA 6159). The laminate was cured for 7 days at 40° C. Bond-strength values for this laminate resulted in 206 N/m for the non-sealed part and 260 N/m for the sealed part.

Afterwards delamination was performed as described in Example 4, which only a few changes, namely using a different delamination solution (2% NaOH, 0.5% Tensid Polyciry PC2, 0.1% antifoam Tubifoam KE 100), a different heating temperature of 85° C. and a flake size of 0.5×0.5 cm.

Already after 15 minutes the first flakes started to delaminate. After 30 minutes all the flakes were delaminated.

EXAMPLE 5

With the solvent-based composition according to example 2 the laminate structure was MDOPE/color/white/SB OBC/PE was prepared as in example 4.

The structure was then subjected to 20 cycles on a gelbo instrument, setting D.

To test the structure's grease barrier performance, a testing assembly consisting of a glass plate, a TLC plate with UV indicator, a laminated sample (as described above), a grease solution, Whatman filter paper, and 500 g weight was set up. A concentrated grease solution was prepared by dissolving Sudan Red 7B dye in olive oil. The TLC plate was covered with the laminated sample with the UV indicator-containing side of the TLC plate facing up towards the print side of the laminate, MDOPE. A filter paper soaked in dye solution was placed onto the sealant web PE side of the laminated sample and topped with a weight of 500 g. The testing assembly was then placed in an oven preheated to 60° C. Grease permeation was checked after 48-72 hours by visualizing the TLC plate with a UV lamp and checking for visual dye stains.

It was found that the solvent-based composition according to the present invention demonstrated exceptional grease barrier capabilities even under high-temperature conditions.

The invention claimed is:

1. A solvent-based composition for preparing an oxygen barrier coating, comprising a) a binder polymer containing polar functional groups that are capable of interacting with an acidic group;

b) an acid containing at least two reactive acidic groups; and c) an organic solvent in an amount from 40 to 80 wt.-%, based on the entire amount of the solvent-based composition.

2. The solvent-based composition according to claim 1, wherein said polar functional groups are selected from the group consisting of hydroxy, amino, thiol, amide, carbonyl, ester, and acetal groups.

3. The solvent-based composition according to claim 1, wherein each monomer unit of the binder polymer comprises at least one of said polar functional groups.

4. The solvent-based composition according to claim 3, wherein said binder polymer is selected from the group consisting of polyvinyl pyrrolidone, nitrocellulose and polyvinyl butyral.

5. The solvent-based composition according to claim 1, wherein said acid is an organic acid containing at least two reactive carboxyl groups.

6. The solvent-based composition according to claim 5, wherein said acid is an organic acid selected from the group consisting of oxalic acid, malonic acid, succinic acid, glutaric acid, adipic acid, tartaric acid, citric acid, boric acid, malic acid, polyacrylic acid and isocitric acid.

7. The solvent-based composition according to claim 1, wherein said organic solvent is a polar organic solvent.

8. The solvent-based composition according to claim 7, wherein said polar organic solvent is an alcohol or a combination of alcohol and ester.

9. A coated product, comprising a substrate and an oxygen-barrier coating layer, wherein said oxygen-barrier coating layer is made from the solvent-based composition according to claim 1.

10. The coated product according to claim 9, wherein said substrate is selected from the group consisting of paper and a plastic substrate.

11. The coated product according to claim 10, wherein said plastic substrate is selected from the group consisting of polyethylene, such as MDO-PE, biaxially oriented polyethylene, polypropylene, such as biaxially oriented polypropylene, polyethylene terephthalate, oriented polyamide and polylactic acid.

12. The coated product according to claim 9, wherein said coated product is a laminate, wherein said laminate contains two substrates between which said oxygen-barrier coating layer, at least one ink layer and optionally an adhesive layer are provided.

13. The coated product according to claim 9, wherein said coated product is a flexible packaging.

14. A method for making a coated product according to claim 9, comprising the steps:

a) providing a substrate having a surface;

b) providing a solvent-based composition for preparing an oxygen barrier coating;

c) optionally providing at least one ink composition;

d) optionally applying the at least one ink composition onto the surface of the substrate;

e) and applying the solvent-based composition onto the surface of the substrate or onto the surface of a layer applied onto said substrate.

15. The method according to claim 14, where additionally at least one ink composition is applied onto said oxygen barrier coating and formed into an ink layer.

16. The solvent-based composition according to claim 2, wherein each monomer unit of the binder polymer comprises at least one of said polar functional groups.

17. The solvent-based composition according to claim 16, wherein said binder polymer is selected from the group consisting of polyvinyl pyrrolidone, nitrocellulose and polyvinyl butyral.

* * * * *